(12) United States Patent
Collins et al.

(10) Patent No.: US 7,306,035 B2
(45) Date of Patent: Dec. 11, 2007

(54) PROCESS FOR TREATING A FORMATION

(75) Inventors: Ian Ralph Collins, Sunbury-on-Thames (GB); Trevor Jones, Amersham (GB); Christopher George Osborne, Sandhurst (GB)

(73) Assignee: BP Exploration Operating Company Limited, Middlesex (GB)

( * ) Notice: Subject to any disclaimer, the term of this patent is extended or adjusted under 35 U.S.C. 154(b) by 278 days.

(21) Appl. No.: 10/524,050

(22) PCT Filed: Aug. 6, 2003

(86) PCT No.: PCT/GB03/03428

§ 371 (c)(1),
(2), (4) Date: Feb. 8, 2005

(87) PCT Pub. No.: WO2004/016906

PCT Pub. Date: Feb. 26, 2004

(65) Prior Publication Data

US 2006/0162928 A1    Jul. 27, 2006

(30) Foreign Application Priority Data

Aug. 15, 2002  (GB) ................... 0219037.9

(51) Int. Cl.
*E21B 41/04* (2006.01)
*E21B 43/12* (2006.01)
*C09K 8/528* (2006.01)
*C09K 8/532* (2006.01)
*C09K 8/536* (2006.01)

(52) U.S. Cl. .............. 166/263; 166/279; 166/295; 166/300; 507/211; 507/216; 507/225; 507/271; 507/902; 507/906

(58) Field of Classification Search ............... 166/279, 166/263, 295, 300, 310, 371, 902; 507/211, 507/213, 214, 216, 225, 269, 271, 902, 903, 507/906, 939
See application file for complete search history.

(56) References Cited

U.S. PATENT DOCUMENTS

| 3,483,925 | A | * | 12/1969 | Slyker ..................... 166/279 |
| 3,531,409 | A | | 9/1970 | Seffens et al. |
| 3,704,750 | A | * | 12/1972 | Miles et al. ................. 166/279 |
| 3,749,172 | A | | 7/1973 | Hessert et al. |
| 4,202,795 | A | | 5/1980 | Burnham et al. |
| 4,741,400 | A | * | 5/1988 | Underdown ............... 166/279 |
| 4,779,679 | A | * | 10/1988 | Snavely et al. ............. 166/279 |
| 4,836,284 | A | * | 6/1989 | Tinker ....................... 166/279 |
| 4,982,793 | A | | 1/1991 | Holtmyer et al. |
| 5,060,728 | A | * | 10/1991 | Yan ........................... 166/279 |
| 5,067,565 | A | | 11/1991 | Holtmyer et al. |
| 5,224,543 | A | * | 7/1993 | Watkins et al. ............. 166/279 |
| 5,322,121 | A | * | 6/1994 | Hrachovy ................... 166/279 |
| 5,547,025 | A | | 8/1996 | Ahmed et al. |
| 5,565,601 | A | * | 10/1996 | Ihara et al. ................. 558/102 |
| 5,642,783 | A | | 7/1997 | Moradi-Araghi et al. |
| 5,690,174 | A | * | 11/1997 | Chapman et al. ........... 166/275 |
| 5,964,291 | A | * | 10/1999 | Bourne et al. .............. 166/279 |
| 6,380,136 | B1 | | 4/2002 | Bates et al. |
| 6,464,009 | B2 | * | 10/2002 | Bland et al. ................ 166/300 |
| 2004/0231848 | A1 | * | 11/2004 | Pakulski et al. ........... 166/305.1 |

FOREIGN PATENT DOCUMENTS

| EP | 0 193 369 A2 | 9/1986 |
| EP | 0 261 865 A2 | 3/1988 |
| EP | 0 544 377 A1 | 6/1993 |
| EP | 0 604 988 A2 | 7/1994 |
| EP | 1 132 569 A2 | 9/2001 |
| WO | WO 96/04462 A1 | 2/1996 |
| WO | WO 96/29501 | 9/1996 |
| WO | WO 97/45625 | 12/1997 |
| WO | WO 01/49971 A1 | 7/2001 |
| WO | WO 01/94744 A1 | 12/2001 |
| WO | WO 03/033860 A2 | 4/2003 |

OTHER PUBLICATIONS

Powell, R.J., et al; SPE 28999; "Controlled-Release Scale Inhibitor for Use in Fracturing Treatments"; *Society of Petroleum Engineers*; pp. 571-579 (1995).

* cited by examiner

*Primary Examiner*—George Suchfield
(74) *Attorney, Agent, or Firm*—Nixon & Vanderhye

(57) ABSTRACT

A method of introducing an oil field or gas field production chemical into a hydrocarbon-bearing porous subterranean formation penetrated by a wellbore comprising: injecting a gelling composition comprising an aqueous liquid, an oil field or gas field production chemical, and a gellable polymer through the wellbore into the porous subterranean formation wherein the gellable polymer forms a gel within the pores of the subterranean formation thereby encapsulating the production chemical in the gel; and controllably releasing the production chemical from the gel into a formation fluid.

23 Claims, No Drawings

PROCESS FOR TREATING A FORMATION

This application is the U.S. National Phase of International Application PCT/GB2003/003428, filed 6 Aug. 2003, which designated the U.S. PCT/GB2003/003428 claims priority to British Application No. 0219037.9 filed 15 Aug. 2002. The entire content of these applications are incorporated herein by reference.

The present invention relates to oil field or gas field production chemicals, in particular, scale inhibitors and their use.

BACKGROUND OF THE INVENTION

Scale inhibitors are used in production wells to stop scaling in the rock formation and/or in the production lines down hole and at the surface. Scale is a slightly soluble inorganic salt, such as barium or strontium sulphate, calcium carbonate, calcium sulphate or calcium fluoride. In the production of hydrocarbons from subterranean formations the deposition of scale on surfaces and production equipment is a major production problem. Scale build-up decreases permeability of the formation, reduces well productivity and shortens the lifetime of production equipment. In order to clean scaled-up wells and equipment it is necessary to stop the production i.e. by shutting in the well which is time-consuming and costly.

To minimise scale build-up a solution of a scale inhibitor may be injected by force into the formation via a production well-bore. After injection the production well is shut-in during which time the scale inhibitor is absorbed within the formation. After the shut-in period the production well is returned on stream and the inhibitor is slowly desorbed into the fluids in the formation to inhibit scale deposition. The fluids produced therefrom are analysed to determine the scale inhibitor concentration. When the concentration of inhibitor in the fluids has reduced to a certain level then further treatments will be required. An aqueous-based scale inhibitor may have a short lifetime of a few weeks. The continual need for such treatments is therefore costly, not only in terms of production shut down periods but also in the cost of the chemical scale inhibitor used.

Other water-soluble or water-dispersible inhibitors used in production well environments include corrosion inhibitors, hydrogen sulphide scavengers or hydrate inhibitors. These too may need shut-ins.

According to U.S. Pat. No. 5,547,025, it is well-known to those skilled in the art that gelled or crosslinked water-soluble polymers are useful in enhanced oil recovery and other oil field operations. In particular, they have been used to alter the permeability of underground formations in order to enhance the effectiveness of water flooding operations. Generally, polymers along with an appropriate crosslinking system are injected in an aqueous solution into the formation. The polymers then permeate into and gel in the regions of the formation having the highest water permeability. Specifically, the process of U.S. Pat. No. 5,547,025 comprises injecting into a formation a gelling composition which comprises a carboxylate-containing polymer, a crosslinking agent and a liquid wherein the gelling composition forms a gel when injected into the formation.

DETAILED DESCRIPTION OF THE INVENTION

It has now been found that delayed release of an oil field or gas field production chemical can be achieved by incorporating the production chemical in a gelling composition which is injected into a hydrocarbon-bearing subterranean formation thereby allowing a decrease in the frequency of squeeze/shut in operations and an increase in the oil/gas production rate.

Thus, according to a first embodiment of the present invention there is provided a method of introducing an oil field or gas field production chemical into a hydrocarbon-bearing porous subterranean formation penetrated by a well-bore comprising:

injecting a gelling composition comprising an aqueous liquid, an oil field or gas field production chemical, and a gellable polymer through the wellbore into the porous subterranean formation wherein the gellable polymer forms a gel within the pores of the subterranean formation thereby encapsulating the production chemical in the gel; and controllably releasing the production chemical from the gel into a formation fluid.

Controlled release of the oil field or gas field production chemical (hereinafter "production chemical") into the formation fluid occurs upon degrading or breaking of the gel and is advantageous in that it extends the lifetime of the production chemical and reduces the number of treatments required. Consequently production downtime and chemical costs are reduced.

The gelling composition is preferably injected into the near wellbore region of the well such that the gel is set up and the production chemical is controllably released therefrom in the near wellbore region. By "near well bore region" is meant a radial distance of less than 100 feet, preferably less than 50 feet, more preferably, less than 30 feet from the wellbore.

Preferably, the gel is substantially immobile within the pores of the formation.

Without wishing to be bound by any theory, it is believed that the gel may act as a relative permeability modifier. Thus, hydrocarbon formation fluids may diffuse or percolate through the gel at a faster rate than aqueous formation fluids.

Suitably, the production chemical is released into an aqueous formation fluid, a hydrocarbon formation fluid or a mixture thereof. Preferably, the aqueous formation fluid is a brine. Preferably, the hydrocarbon formation fluid is selected from the group consisting of crude oil, natural gas and gas field condensate.

Preferably, the production chemical is controllably released from the gel over a period of at least 1 month, more preferably 3 to 12 months.

It is envisaged that the gelling composition may comprise an admixture of the aqueous liquid, the production chemical and the gellable polymer and it is this admixture which is injected into the subterranean formation. Suitably, the production chemical may be dissolved, dispersed or suspended in the aqueous liquid of the admixture. Suitably, the gellable polymer is dissolved or dispersed in the aqueous liquid of the admixture.

Gellable polymers suitable for use in this invention are those which are soluble or dispersible in an aqueous liquid to increase the viscosity of the liquid. Preferred gellable polymers are those which are capable of crosslinking with a suitable crosslinking agent via crosslinkable groups.

Thus, according to a preferred embodiment of the present invention there is provided a method of treating a hydrocarbon-bearing porous subterranean formation penetrated by a wellbore comprising:

injecting a gelling composition comprising: (i) an aqueous liquid, (ii) an oil or gas field production chemical, (iii) a gellable polymer having crosslinkable groups, and (iv) a crosslinking agent through the wellbore into said porous subterranean formation wherein a gel is formed within the pores of the formation through crosslinking of the crosslinkable groups of the polymer with the crosslinking agent thereby encapsulating the oil or gas field production chemical in the gel; and controllably releasing the oil or gas field production chemical from the gel into the formation fluids.

It is envisaged that the gelling composition may comprise an admixture of the aqueous liquid, the production chemical, the gellable polymer and the crosslinking agent. Alternatively, the gellable polymer may be dispersed or dissolved in a first aqueous fluid (hereinafter "polymer slug") and the crosslinking agent may be dissolved in a second aqueous fluid (hereinafter "crosslinking agent slug"). The polymer slug and crosslinking agent slug are then injected sequentially into the formation with the production chemical dissolved, dispersed or suspended in the polymer slug and/or the crosslinking agent slug. It is envisaged that the polymer slug may be injected into the formation before the crosslinking agent slug or vice versa. Optionally, an aqueous spacer is injected between the polymer slug and crosslinking agent slug. Optionally, the subterranean formation is pre-flushed with an aqueous fluid prior to injection of the polymer slug and crosslinking slug. Suitably, the production chemical may be dissolved, dispersed or suspended in one or more of the aqueous pre-flush fluid, the polymer slug, the crosslinking agent slug or aqueous spacer. Optionally, the subterranean formation is over-flushed with an aqueous fluid. During sequential addition, the gelling composition is formed within the formation by either back-producing the gellable polymer over the crosslinking agent or back-producing the crosslinking agent over the gellable polymer. Where the production chemical is dissolved, dispersed or suspended in the pre-flush fluid it is necessary to back produce the pre-flush fluid over the polymer and crosslinking agent.

Preferably, the gel that is formed within the pores of formation through crosslinking of the crosslinkable groups of the gellable polymer with the crosslinking agent is of a type that is collapsible to allow hydrocarbon flow, as described in International patent application numbers WO 01/49971 and WO 03/033860 which are herein incorporated by reference.

Suitably the oil or gas field production chemical is selected from (i) scale inhibitors, (ii) corrosion inhibitors, (iii) hydrogen sulphide scavengers and (iv) hydrate inhibitors.

Scale inhibitors include water-soluble organic molecules having at least 2 carboxylic and/or phosphonic acid and/or sulphonic acid groups e.g. 2-30 such groups. Preferred scale inhibitors are oligomers or polymers, or may be monomers with at least one hydroxyl group and/or amino nitrogen atom, especially in hydroxycarboxylic acids or hydroxy or aminophosphonic, or, sulphonic acids. Scale inhibitors are used primarily for inhibiting calcium and/or barium scale. Examples of such compounds used as scale inhibitors are aliphatic phosphonic acids having 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different (e.g. as described further in published EP-A479462, the disclosure of which is herein incorporated by reference). Other scale inhibitors are polycarboxylic acids such as acrylic, maleic, lactic or tartaric acids, and polymeric anionic compounds such as polyvinyl sulphonic acid and poly(meth)acrylic acids, optionally with at least some phosphonyl or phosphinyl groups as in phosphinyl polyacrylates. The scale inhibitors are suitably at least partly in the form of their alkali metal salts e.g. sodium salts.

Examples of corrosion inhibitors are compounds for inhibiting corrosion on steel, especially under anaerobic conditions, and may especially be film formers capable of being deposited as a film on a metal surface e.g. a steel surface such as a pipeline wall. Such compounds may be non-quaternised long aliphatic chain hydrocarbyl N-heterocyclic compounds; mono- or di-ethylenically unsaturated aliphatic groups e.g. of 8-24 carbons such as oleyl are preferred. The N-heterocyclic group can have 1-3 ring nitrogen atoms with 5-7 ring atoms in each ring; imidazole and imidazoline rings are preferred. The ring may also have an aminoalkyl e.g. 2-aminoethyl or hydroxyalkyl e.g. 2-hydroxyethyl substituent. Oleyl imidazoline may be used. Where corrosion inhibitors are released into the formation using the method of the present invention, these inhibitors are effective in reducing corrosion of metal surfaces as they are produced out of the well.

Hydrogen sulphide scavengers include oxidants, such as inorganic peroxides, e.g. sodium peroxide, or chlorine dioxide, or aldehydes e.g. of 1-10 carbons such as formaldehyde or glutaraldehyde or (meth)acrolein.

Hydrate inhibitors include salts of the formula $[R^1(R^2)XR^3]^+Y^-$, wherein each of $R^1$, $R^2$ and $R^3$ is bonded directly to X, each of $R^1$ and $R^2$, which may the same or different is an alkyl group of at least 4 carbons, X is S, $NR^4$ or $PR^4$, wherein each of $R^3$ and $R^4$, which may be the same or different, represents hydrogen or an organic group with the proviso that at least one of $R^3$ and $R^4$ is an organic group of at least 4 carbons and Y is an anion. These salts may be used in combination with a corrosion inhibitor and optionally a water soluble polymer of a polar ethylenically unsaturated compound. Preferably, the polymer is a homopolymer or a copolymer of an ethylenically unsaturated N-heterocyclic carbonyl compound, for example, a homopolymer or copolymer of N-vinyl-omega caprolactam. Such hydrate inhibitors are disclosed in EP 0770169 and WO 96/29501 which are herein incorporated by reference.

Suitably, the oil or gas field production chemical (hereinafter "production chemical") is water-soluble or water-dispersible. Alternatively, particles of the production chemical may be suspended in the aqueous liquid component of the gelling composition. The particle size should be sufficiently small to allow the particles to enter a formation. If the particles are too large they will tend to settle out and potentially lead to agglomeration problems. The particle size may be 100% less than 10 microns, preferably 100% less than 7 microns and especially 100% less than 5 microns. Preferably the particle size is not less than 25 nanometres and advantageously not less than 200 nanometres. The average particle size is usually between 1 and 3 microns. The particulate production chemical may be of the type described in EP 0902859 which is herein incorporated by reference.

The particulate production chemical may be coated with a suitable coating agent also as described in EP 0902859. The coated particulate production chemical may be isolated from its production medium before dispersion in the gelling composition.

Suitable coating agents include water-soluble polymers or oil-soluble polymers. Preferred water-soluble polymers for coating the particles of production chemical include polyacrylic acids; polymaleic acids; polyacrylamide; polymethacrylate; polyvinylsulphonates; copolymers of monomers selected from the group consisting of acrylic acid, maleic acid, acrylamide, methacrylate, 2-acrylamido-2-methylpropane-sulfonic acid, and vinylsulphonate; lignosulphonates; hydroxy methyl cellulose; carboxy methyl cellulose; carboxy methyl ethyl cellulose; hydroxy methyl ethyl cellulose; hydroxylpropyl methyl cellulose; methyl hydroxy propyl cellulose; sodium alginates; polyvinyl pyrolidone; polyvinyl pyrolidone acrylic acid co-polymers; polyvinyl pyrolidone caprolactam co-polymers; polyvinyl alcohol; polyphosphates, polystyrene-maleinates, poloxamers and poloxamines. Suitably, the poloxamers are linear ABA block co-polymers having the general structure $(EO)_n-(PO)_m-(EO)_n$ where n and m are integers and EO and PO represents structural units derived from ethylene oxide and propylene oxide respectively. Suitably, the polaxamines are ABA block co-polymers having a branched structure with a central ethylene diamine bridge i.e. $([(EO)_n-(PO)_m]_2-N-CH_2-CH_2-N-[(EO)_n-(PO)_m]_2)$ where n, m, EO and PO have the same meaning as for the poloxamers. Preferably, the water-soluble polymer has a molecular weight in the range 1,000-100,000, preferably 5,000 to 30,000, for example, 15,000 to 25,000. Preferred oil-soluble polymers for coating the particles of production chemical include polyethers, polyamine derivatives or carbon backbone polymers having pendant nitrogen and/or oxygen atoms as described in EP 0902859.

Without wishing to be bound by any theory, the polymer will precipitate onto the particles of production chemical and will at least partially coat the particles. Suitably, at least 75%, preferably, at least 90%, more preferably, at least 95% of the surface of the particles is coated with the polymer. Preferably, the coating is continuous (100% surface coverage). Preferably, the coating has a thickness of less than 30 nm, preferably, less than 20 nm.

The coated production chemical provides for further controlled release of the production chemical into the formation fluids and/or the produced fluids.

Gellable polymers suitable for use in this invention include but are not limited to biopolysaccharides, cellulose ethers and acrylamide-containing polymers. Suitably, the gellable polymers contain crosslinkable groups such as carboxylate, phosphonate or hydroxyl groups. Where the polymer contains carboxylate and/or phosphonate groups these groups may be in their acid or salt form. Suitable salts include ammonium, alkali metal or alkaline earth metal salts.

Suitable biopolysaccharides include natural and derivatized polysaccharides which are soluble or dispersible in an aqueous liquid to increase the viscosity of the liquid. Examples of natural gums include arabic gum, ghatti gum, tamarind gum, tagacanth gum, guar gum, locust bean gum, karaya gum, xanthan gum, galactomannan gum and the like. Preferred biopolysaccharides have molecular weights in the range 200,000 to 3,000,000. Modified gums such as carboxyalkyl derivatives, for example, carboxymethyl guar, and hydroxyalkyl derivatives, for example, hydroxyethyl guar, hydroxypropyl guar can also be employed. Doubly derivatized gums such as carboxymethylhydroxyethyl guar, carboxymethylhydroxypropyl guar can also be used.

Modified celluloses and derivatives thereof can also be employed in the practice of the present invention, for example, cellulose ethers, esters and the like. In general, any of the water-soluble cellulose ethers can be used. These cellulose ethers include, among others, the various carboxyalkyl cellulose ethers, such as carboxyethyl cellulose and carboxymethyl cellulose; mixed ethers such as carboxyalkylhydroxyalkyl cellulose ethers, e.g., carboxymethyl hydroxyethyl cellulose; hydroxyalkyl celluloses such as hydroxyethyl cellulose and hydroxypropyl cellulose; alkylhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; alkylalkyl celluloses such as methylethylcellulose; hydroxyalkylalkyl celluloses such as hydroxypropylmethyl cellulose; and the like.

Other suitable gellable polymers include the various polyacrylamides and related polymers which are partially hydrolysed and which are water-soluble, such as those disclosed in U.S. Pat. No. 3,749,172 and EP 0 604 988 (herein incorporated by reference). Examples of suitable polymers include the homopolymers and copolymers of acrylamide and methacrylamide. Also, suitable are water-soluble copolymers resulting from the polymerisation of acrylamide and/or methacrylamide with another ethylenically unsaturated monomer copolymerisable therewith, wherein sufficient acrylamide and/or methacrylamide is present in the monomer mixture to impart water-solubility to the resulting copolymer. The ethylenically unsaturated monomer which is copolymerisable with the acrylamide and/or methacrylamide may be selected from the group consisting of acrylic acid, methacrylic acid, vinyl sulfonic acid, vinylbenzylsulfonic acid, vinylbenzenesulfonic acid, vinyl acetate, vinylpyridine, styrene, acrylonitrile, methyl acrylonitrile, vinyl alkyl ether, vinyl chloride, maleic anhydride, N-vinyl-2-pyrrolidone, 2-acrylamido-2-methylpropanesulfonic acid, N-vinyl-2-pyrrolidone, N-vinyl formamide, and the like. Particularly preferred polymers include copolymers of N-vinyl-2-pyrrolidone and acrylamide; terpolymers of 2-acrylamido-2-methylpropanesulfonic acid, acrylamide and N-vinyl-2-pyrrolidone; and copolymers of sodium-2-acrylamido-2-methylpropanesulfonate and acrylamide. Other suitable gellable polymers contain crosslinkable phosphonate groups, for example, polymers which incorporate phosphonic acid monomers. Particularly preferred are copolymers of vinyl phosphonic acid monomers and acrylamide, copolymers of vinyl phosphonic acid monomers and methacrylamide or copolymers of vinyl phosphonic acid monomers, acrylamide and methacrylamide. These copolymers may also incorporate one or more further comonomers selected from the group consisting of acrylic acid, methacrylic acid, vinyl sulfonic acid, vinylbenzylsulfonic acid, vinylbenzenesulfonic acid, vinyl acetate, vinylpyridine, styrene, acrylonitrile, methyl acrylonitrile, vinyl alkyl ether, vinyl chloride, maleic anhydride, N-vinyl-2-pyrrolidone, 2-acrylamido-2-methylpropanesulfonic acid, N-vinyl-2-pyrrolidone, N-vinyl formamide, and the like.

Where the polymer is an acrylamide or related polymer, the mole percent of structural units containing carboxylate and/or phosphonate groups in the polymer is generally in the range of from 0.01 to 75 mole %. It is preferred that the mole percent of structural units containing carboxylate and/or phosphonate groups is in the range of 0.1 to 45, preferably 0.1 to 25, and most preferably 0.1 to 10 mole %.

Generally, the molecular weight of the acrylamide or related polymer is in the range of 10,000 to 50,000,000, preferably in the range 100,000 to 20,000,000, more preferably 200,000 to 15,000,000.

Further gellable polymers for use in the present invention include graft copolymers prepared by reacting hydrophilic polymers with certain allyl or vinyl monomers having a crosslinkable substituent. For example, graft copolymers of hydrophilic polymers and vinyl phosphonate are disclosed in U.S. Pat. No. 5,701,956 which is herein incorporated by reference. The hydrophilic polymer may be selected from polyacrylamides, polymethacrylamides, partially hydrolysed polyacrylamide, partially hydrolysed polymethacrylamide, copolymers containing acrylamide, copolymers containing methacrylamide, hydroxyalkylcelluloses, guar gum and derivatives thereof and the like. Graft copolymers of cellulose derivatives are described in U.S. Pat. No. 4,982,793 and U.S. Pat. No. 5,067,565 which are herein incorporated by reference. Preferably, the cellulose derivative is a hydroxyalkyl cellulose, in particular, hydroxyethyl cellulose. The preferred grafting monomers include glyceryl allyl ether, 2,3-dihydroxypropylmethacrylate, vinyl phosphonic acid, allyl glycidyl ether and glycidyl methacrylate.

The concentration of the gellable polymer in the gelling composition is generally in the range of about 0.01 to 0.5 weight percent, preferably about 0.05 to 0.4 weight percent, more preferably 0.05 to 0.35 weight percent, for example, 0.15 to 0.35 weight percent. A relatively low concentration of gellable polymer is advantageous since this mitigates the risk of a rigid blocking gel being formed in the formation.

Preferably, the gelling composition contains a buffering agent. Preferably, the buffering agent has a buffering capacity at a pH of up to about 5.5, preferably in a pH range of 4.5 to 5.5. A typical buffering agent is sodium acetate/acetic acid. Where the gelling composition contains a buffering agent, the concentration of buffering agent will be dependent on the type of buffering agent employed and the buffering capacity of the rock formation. Generally, it is preferred that the buffering agent is present at a concentration in the range 0.001 to 10% by weight, preferably 0.01 to 1% by weight (based on the weight of the gelling composition).

As discussed above, the aqueous gelling composition may include a cross-linking agent to further enhance the development of viscosity by cross-linking crosslinkable groups on the gellable the polymer. The cross-linking agent may comprise any of the well known polyvalent metal compounds which are capable of creating a cross-linked structure with the particular polymer utilized. The presently preferred polyvalent metal compound is a metal compound selected from the group consisting of zirconium compounds, titanium compounds, aluminum compounds, iron compounds, chromium compounds, hafnium compounds, niobium compounds and antimony compounds, preferably zirconium and titanium compounds. Examples of suitable multivalent metallic compounds include, but are not limited to, ammonium zirconium carbonate, sodium zirconium carbonate, potassium zirconium carbonate, ammonium zirconium fluoride, ammonium zirconium chloride, zirconium ammonium citrate, zirconium chloride, tetrakis(triethanolamine)zirconate, zirconium carbonate, zirconyl ammonium carbonate, sodium zirconium lactate, zirconium lactate, zirconium acetylacetonate, zirconium diisopropylamine, zirconium 2-ethylhexanoate, zirconium acetate, zirconium neodecanoate, zirconium complex of hydroxyethyl glycine, zirconium malonate, zirconium propionate, zirconium tartrate, ammonium titanium carbonate, titanium acetylacetonate, titanium ethylacetoacetate, titanium triethanolamine, ammonium titanium lactate, titanium chloride, titanium carbonate, ammonium titanium chloride, titanium acetylacetonate, titanium triethanolamine, chromium citrate, aluminum acetate, potassium pyroantimonate, and combinations of any two or more thereof. These compounds are commercially available. Preferably, the crosslinking agent is a zirconium lactate of formula $[CH_3CH(OH)CO_2]_nX_mZr$ wherein X is an mono-valent anion, for example, a halide (chloride, bromide, iodide or fluoride) or hydroxide, m and n are integers such that m+n=4 and n is 1 to 4, preferably 3 or 4.

The concentration of crosslinking agent in the gelling composition may vary over a broad range of from 0.001 to 0.5 weight percent based on the concentration of the polyvalent metal. The concentration of crosslinking agent in the gelling composition is preferably in the range of 0.01 to 0.25 weight percent, more preferably 0.025 to 0.2 weight percent, most preferably 0.025 to 0.15 weight percent based on the concentration of the polyvalent metal.

The aqueous fluid which is used to prepare the gelling composition may be pure water, tap water, seawater, aquifer water, a synthetic brine or a produced brine.

In a typical treatment, an aqueous pre-flush fluid (for example, a brine or fresh water) may first be injected (from a surface injection facility) through a well into the porous formation followed by the gelling composition (injected either as an admixture or sequentially, as discussed above) and an optional overflush fluid. Preferably, the gelling composition is introduced into an aqueous zone of the porous subterranean formation. However, it is also envisaged that the gelling composition maybe introduced into a hydrocarbon zone of the porous subterranean formation. Without wishing to be bound by any theory it is believed that the gel which is formed within the pores of the formation acts as a relative permeability modifier. Thus, hydrocarbon formation fluids diffuse or percolate through the gel at a faster rate than aqueous formation fluids.

The well may then be shut-in for a short period of time of up to 50 hours, preferably 2 to 24 hours, for example, 5 to 15 hours before the well is put back on production. After the well is put back in production, the production chemical is controllably released into the formation fluids and into the produced fluids upon degradation of the gel. The produced fluids may be analysed, for example, at the surface to monitor the concentration of production chemical to determine the need for further treatments.

The amount of production chemical used is preferably in the range from 1-25% w/w of the gelling composition, more preferably from 5-15% w/w, most preferably from 6-10% w/w. Within these ranges the amount used would depend upon the nature of the chemical used and its intended purpose.

Where the components of the gelling composition are injected simultaneously, the gelling composition may contain a gelation delaying agent in order to mitigate the risk of the gel being set up prematurely, for example, in the wellbore. A gelation delaying agent is defined herein as a chemical or mixture of chemicals which delays the rate of gelation. A delaying agent useful for the retardation of the rate of gelation is generally a carboxylic acid or salts thereof. A commonly known delaying agent can also be an amine that has more than one functional group and contains one or more hydroxyls and that can chelate the polyvalent metal moiety of the polyvalent metal compound. It is envisaged that the oil field or gas field production chemical, in particular, a scale inhibitor, may itself act as a gelation delaying agent.

Suitably, the extent of gelation of the polymer is such that the gel which is formed within the formation is strong enough to encapsulate an aqueous solution or dispersion of the production chemical and/or particles comprising the production chemical within its structure.

The gelation rate is generally longer than 1 hour, preferably longer than 2 hours, more preferably longer than 3 hours, most preferably longer than 4 hours, for example, longer than 10 hours.

Preferably, the gel which is set up in the formation is capable of gradually breaking so as to controllably release the solution or dispersion of the production chemical or the particles comprising the production chemical into the formation fluid.

The gel may degrade under the conditions encountered in the formation. Thus, the gel may be thermally degradable or biodegradable. The rate of degradation of the gel will be dependent upon, amongst others parameters, the formation temperature, the formation pressure, water cut of the produced fluids, formation permeability, flow rate and depth of placement. Suitably the gel starts to thermally degrade at a temperature in the range 50 to 150° C., preferably 50 to 100° C.

Alternatively, the gelling composition may contain an effective amount of a gel breaker so as to provide controlled breaking of the gel. The gel breaker may be selected from mild oxidizing agents such as ammonium persulfate, potassium dichromate, potassium permanganate, peroxides, alkali metal chlorites and alkali metal hypochlorites. Alternatively, the gel breaker may be a borate. It is also envisaged that the production chemical, for example, a scale inhibitor may act as a sequestration agent for the polyvalent ion of the crosslinking agent thereby acting as a gel breaker. Where the gellable polymer is a polysaccharide or a cellulose ether derivative, enzymes may be used as breakers. Suitable enzymes are alpha and beta amylases, amyloglucosidase, oligoglucosidase, invertase, maltase, cellulase and hemicellulase. Acids (for example, peracids) or chelants (for example, ethylenediaminetetracetic acid) may also be used to break the gel.

The amount of breaker employed is that required to reduce the viscosity of the gelled composition to a preselected lower viscosity or to achieve a complete break within a desired period of time. The optimum or effective amount of breaker employed in the present invention depends on factors such as the desired life of the gel, the particular gellable polymer and its concentration, the particular breaker and the formation temperature as well as other factors. Typically, however, from about 0.1 to about 10 wt % of breaker is employed in the gelling composition. Preferably, the amount of breaker employed is such to achieve a desired break in from about 12 to 500 hours. It is envisaged that the breaker may be encapsulated in the gelling composition. Alternatively, the breaker may be contained in the aqueous pre-flush fluid and is subsequently back produced through the gel.

In particular, the present invention provides a method for increasing the effectiveness of an oil or gas field production chemical by reducing the number of squeezing and shut-in operations needed to increase the production rate from a wellbore penetrating a hydrocarbon-bearing porous subterranean formation, said method comprising:

A) injecting a gelling composition comprising an aqueous liquid, an oil or gas field production chemical and a gellable polymer through the wellbore into the porous subterranean formation wherein the polymer forms a gel in the formation thereby encapsulating the oil or gas field production chemical in the gel;

B) after injecting the gelling composition, optionally overflushing the porous subterranean formation with an aqueous fluid or an oil;

C) subsequently, shutting-in the well for a period of time; and

D) putting the well back on production and controllably releasing the oil or gas field production chemical from the gel into a formation fluid that is being produced from the well.

The invention will now be illustrated by means of the following examples.

EXAMPLES

Preparation of Gelling Composition

Xanthan gum (BARAXAN D™ ex Baroid), 2.5 g, was weighed into a plastic weighing boat. 497.5 g of filtered seawater (0.45 μm mesh), collected off the Dorset coast, was weighed out into a 1 litre beaker. A stirrer pellet (typically 30 mm in length) was placed in the beaker which was then placed on a magnetic stirrer. The stirrer was switched on and the stirrer speed increased until a vortex was created in the seawater. The xanthan gum powder was then gradually introduced into the vortex. The resulting mixture was stirred until all of the powder had completely dissolved. 50 ml aliquots of this solution were then syringed into 4 oz powder jars.

2.5ml of a 20% active solution of scale inhibitor (CALNOX ML3263™,(a 40% by weight solution (pH of 6) of a sodium salt of polyvinyl sulphonate polvacrylic acid copolymer) ex Baker Petrolite) in seawater was added to each sample jar. Once the scale inhibitor had been introduced, the lids were replaced, and the jars were shaken for 30 seconds.

1 ml of a buffer solution was then pipetted into each jar. The jar lids were replaced and the jars were again shaken for 30 seconds. The buffer formulation employed was prepared by mixing:

1) 20% wt/vol glacial acetic acid in deionised water, and 2) 50% wt/vol sodium acetate trihydrate in deionised water, at a ratio of 1.262:1.86 vol/vol.

A 7% active solution of sodium zirconium lactate crosslinking agent was prepared by diluting a 50% active solution supplied by MEL chemicals with seawater. 1.43 ml of the crosslinking agent solution was added to each powder jar, and the jars shaken for 30 seconds.

The viscosity of the samples was measured using a Brookfield viscometer (LADV1 having RVT and HAT spindle assemblies) immediately after addition of the crosslinking agent solution. Measurements were also made one hour and 16 hours after addition of the crosslinking agent solution with the samples maintained at a temperature of 25° C. during aging by means of a Julabo™ water bath. The results of the viscosity measurements are given in Table 1.

TABLE 1

Viscosity Measurements

| Time (mins) | Viscosity (cP) | | |
|---|---|---|---|
| | $30.6\ s^{-1}$ | $61.2\ s^{-1}$ | $183.6\ s^{-1}$ |
| 0 | 52.5 | 38.4 | 17.0 |
| 60 | 160.1 | 101.9 | 40.3 |
| 960 | 190.9 | 117.8 | 42.1 |

Sandpack Tests

The performance of the gelling composition was assessed using a sand pack test. In this test, a 1 metre metal column of internal diameter 1.27 cm was packed with sand (deconsolidated Clashach sandstone, acid washed and sieved to a 20/40 mesh size) which was then saturated with simulated formation water. By comparing the dry weight of the column with the wet weight, the liquid pore volume of the pack was determined. The pack was then placed in an oven and was connected to a pumping system that allowed fluids to be injected into the pack at a known volumetric flow rate with fluid effluent exiting the pack via a back pressure regulator. The back pressure regulator allowed the pack to be pressurised and heated to above the boiling point of water at ambient temperature. The fluid effluent stream was fed into a sample fraction collector thereby allowing known volumes of samples to be collected for subsequent analysis.

Test Procedure

A sandpack of known liquid pore volume (of between 16.5 and 16.9 ml) was placed in the oven assembly and heated to a temperature of 120° C. with the back pressure regulator set to a pressure of 80 barg. When the sandpack had reached the test temperature, 0.25 pore volumes (ca. 10 ml) of treatment fluid was pumped into the sandpack at a rate of 60 ml/hour. The treatment fluid was either a simulated seawater solution of CALNOX ML3263™ (ex Baker Petrolite) having the same active content of scale inhibitor as the gelling composition prepared as described above (control experiment) or the gelling composition prepared as described above left to age for one hour following addition of the crosslinking agent solution (experiment according to the present invention). 0.25 pore volumes (ca. 10 ml) of simulated seawater was then pumped into the sandpack at a flow rate of 60 ml/hour. The sandpack was then closed off and maintained at a temperature of 120° C. for 24 hours. After the shut in period, the sandpack was physically turned around in the oven assembly so that fluids could be injected into the sandpack in the reverse direction to simulate 'back' flow of a production well. Simulated seawater was then injected into the sandpack at a flow rate of 60 ml/hour for up to 8 hours and either 5 ml or 10 ml samples of the fluid effluent stream were collected for analysis.

The concentration of scale inhibitor (CALNOX ML3263™) in the eluted fluid effluent stream was determined by titrating a known volume of barium chloride solution into the samples and measuring the turbidity developed after 3 minutes using a Hach turbidity meter. The turbidity reading was converted to a scale inhibitor concentration by reference to a previously determined calibrations curve. The results of these sandpack tests were given in Table 2 below.

The composition of the simulated seawater employed in the above test procedure is as follows:

| ion | Concentration (ppm) |
|---|---|
| $Na^+$ | 11010 |
| $K^+$ | 460 |
| $Mg^{2+}$ | 1368 |
| $Ca^{2+}$ | 428 |
| $Sr^{2+}$ | 8 |
| $Cl^-$ | 19700 |
| $SO_4^{2-}$ | 2960 |
| $HCO_3^-$ | 124 |

TABLE 2

Sandpack Tests

| Control | | Gelling Composition | |
|---|---|---|---|
| Volume eluted (ml) | ML3263 Concentration (ppm) | Volume eluted (ml) | ML3263 Concentration (ppm) |
| 5 | 0.00 | 10 | 0.00 |
| 10 | 0.00 | 20 | 0.00 |
| 15 | 0.00 | 30 | 0.00 |
| 20 | 0.00 | 40 | 0.00 |
| 25 | 0.00 | 50 | 0.00 |
| 30 | 1.34 | 60 | 0.00 |
| 35 | 19.05 | 70 | 0.00 |
| 40 | 18.12 | 80 | 0.00 |
| 45 | 28.37 | 90 | 0.00 |
| 50 | 48.87 | 100 | 0.00 |
| 55 | 60.05 | 110 | 1.34 |
| 60 | 253.59 | 120 | 2.28 |
| 65 | 8798.92 | 130 | 7.87 |
| 70 | 19980.43 | 140 | 10.66 |
| 75 | 25571.19 | 150 | 28.37 |
| 80 | 28366.57 | 160 | 32.09 |
| 85 | 38097.28 | 170 | 35.82 |
| 90 | 45551.62 | 180 | 41.41 |
| 95 | 41824.45 | 190 | 346.77 |
| 100 | 26502.98 | 200 | 859.25 |
| 105 | 21844.02 | 210 | 3064.29 |
| 110 | 11853.80 | 220 | 7194.84 |
| 115 | 2091.22 | 230 | 16253.26 |
| 120 | 1998.04 | 240 | 18116.85 |
| 125 | 812.66 | 250 | 18116.85 |
| 130 | 346.77 | 260 | 17185.05 |
| 135 | 25.57 | 270 | 15321.47 |
| 140 | 19.98 | 280 | 10662.50 |
| 145 | 18.12 | 290 | 4399.46 |
| 150 | 13.46 | 300 | 1604.08 |
| 155 | 8.80 | 310 | 1387.07 |
| 160 | 5.07 | 320 | 160.41 |
| 165 | 0.41 | 330 | 40.48 |
| | | 340 | 19.98 |

The data show that the length of time over which the scale inhibitor is eluted from the pack is increased by the use of the gelling composition of the present invention.

Field Trial

The performance of the gelling composition was assessed in a field trial undertaken on the Miller field in the North Sea wherein treatment slugs 1 to 5 (see Table 3) were sequentially injected into the formation via an injection line into a production wellbore. Treatment slug 1 was prepared by spiking the scale inhibitor solution into seawater flowing through the injection line. Treatment slug 2 was prepared by adding the specified amounts of xanthan gum powder, scale inhibitor solution, and buffer solution to a first batch tank and making up the volume to 95 barrels (bbl) with seawater. The resulting mixture was then passed, in series, through 3 further batch tanks, to allow hydration of the xanthan gum, before being injected into the production wellbore. Treatment slug 3 was prepared by adding the specified amounts of xanthan gum powder, scale inhibitor solution, and buffer solution to a first batch tank and making up the volume to 95 bbl with seawater. The resulting mixture was then passed in series through 11 further batch tanks, to allow hydration of the xanthan gum. The crosslinking agent was spiked into the resulting solution during injection of the solution into the production wellbore. Treatment slug 4 was prepared by adding the specified amount of xanthan gum powder, scale inhibitor solution and buffer solution to a first batch tank and making up the volume to 95 bbl with seawater. The resulting mixture was then passed, in series, through 3 further batch tanks to allow hydration of the xanthan gum, before being injected into the production wellbore. Treatment slug 5 was prepared by spiking the scale inhibitor solution into seawater flowing through the injection line. After injection of the treatment slug 5 the well was shut-in for 2 hours before putting the well back on production. The data presented in Table 4 show that scale inhibitor is released into the produced water from the gel that is set up in the formation. The data also show that barium was not being depleted from the produced water through precipitation of barium sulfate therefrom. Furthermore, it was found that the treatment had no detrimental effect on the well as evidenced by the rate of oil production 5 days post treatment being substantially the same as the pre-treatment production rate.

TABLE 3

Injected Sluge

| Treatment Stage | Slug | Volume (bbl) | Slug Composition |
|---|---|---|---|
| Preflush | 1 | 500 | Seawater with: 0.1% by volume of CALNOX ML3263 ™ (scale inhibitor solution)[1] |
| Main Treatment | 2 | 380 | Seawater with: 2% by volume of CALNOX ML3263 ™ (scale inhibitor solution)[1] 0.5% by weight of Xanthan powder[2] 2% by volume of SCW 85134 (sodium acetate/acetic acid buffer solution)[3] |
| Main Treatment | 3 | 1140 | Seawater with: 2% by volume of CALNOX ML3263 ™ (scale inhibitor solution)[1] 0.5% by weight of Xanthan powder[2] 2% by volume of SCW 85134 (sodium acetate/acetic acid buffer solution)[3] 0.5% by volume of SCW 85169 (sodium zirconium lactate crosslinking agent solution)[4] |
| Main Treatment | 4 | 380 | Seawater with: 2% by volume of CALNOX ML3263 ™ (scale inhibitor solution)[1] 0.5% by weight of Xanthan powder[2] 2% by volume of SCW 85134 (sodium acetate/acetic acid buffer solution)[3] |
| Overflush | 5 | 500 | Seawater with 0.1% by volume of ML3263 ™ (scale inhibitor solution)[1] |

1. CALNOX ML 3263™ solution as supplied by Baker Petrolite from a first and a second "tote" tank wherein the volume of solution in the first and second tanks was 4546 and 2272 litres respectively.
2. Xanthan supplied in 61×25 kg sacks.
3. SCW 85134 buffer solution as supplied by Baker Petrolite from a first and a second "tote tank" wherein the volume of solution in the first and second tanks was 4546 and 2272 litres respectively.
4. SCW 85169 crosslinking agent solution as supplied by Baker Petrolite in 205 litre drums (4.5 drums required for treatment slug 3).

TABLE 4

Flow Back Data

| Cumulative Produced Water (bbls) | Ba (mg/l) in Produced Water | Scale Inhibitor (ppm) in Produced Water | % Scale Inhibitor returned. | Cumulative Produced Oil (bbls) |
|---|---|---|---|---|
| 2,183 | 410 | 30281 | 21.0 | 2,159 |
| 2,750 | 115 | 44171 | 28.9 | 2,720 |
| 3,274 | 81 | 54935 | 38.0 | 3,238 |
| 4,278 | 116 | 5296 | 39.7 | 4,231 |
| 5,369 | 81 | 2872 | 40.7 | 5,310 |
| 6,548 | 113 | 1073 | 41.1 | 6,476 |
| 9,123 | 136 | 458 | 41.5 | 9,023 |
| 13,662 | 161 | 411 | 42.1 | 13,512 |
| 13,881 | 175 | 292 | 42.1 | 13,728 |
| 16,762 | 172 | 323 | 42.4 | 16,577 |
| 21,477 | 169 | 158 | 42.6 | 21,240 |
| 22,176 | 195 | 187 | 42.7 | 21,930 |
| 35,495 | 178 | 113 | 43.2 | 35,097 |
| 40,037 | 155 | 54 | 43.2 | 39,587 |
| 53,312 | 166 | 50 | 43.4 | 52,711 |
| 57,854 | 153 | 43 | 43.5 | 57,200 |

The invention claimed is:

1. A method of introducing an oil field or gas field production chemical into a hydrocarbon-bearing porous subterranean formation penetrated by a wellbore comprising:
    injecting a gelling composition comprising an aqueous liquid, an oil field or gas field production chemical, and a gellable polymer through the wellbore into the porous subterranean formation wherein the gellable polymer forms a gel within the pores of the subterranean formation thereby encapsulating the production chemical in the gel; and
    controllably releasing the production chemical from the gel into a formation fluid.

2. A method as claimed in claim 1 wherein the gelling composition comprises (i) an aqueous liquid, (ii) an oil or gas field production chemical, (iii) a gellable polymer having crosslinkable groups, and (iv) a crosslinking agent and wherein the gel is formed within the pores of formation through crosslinking of the crosslinkable groups of the gellable polymer with the crosslinking agent.

3. A method as claimed in claim 2 wherein the crosslinking agent is a polyvalent metal compound selected from the group consisting of polyvalent compounds of zirconium titanium, aluminum, iron, chromium, hafnium, niobium and antimony.

4. A method as claimed in claim 3 wherein the concentration of crosslinking agent in the gelling composition is from 0.001 to 0.5 weight percent based on the concentration of the polyvalent metal.

5. A method as claimed in claim 1 wherein the production chemical is controllably released from the gel into the formation fluid in the near wellbore region of the formation.

6. A method as claimed in claim 1 wherein the formation fluid is selected from the group consisting of a formation brine, crude oil, natural gas and gas field condensate.

7. A method as claimed in claim 1 wherein the oil or gas field production chemical is selected from the group consisting of (i) scale inhibitors, (ii) corrosion inhibitors, (iii) hydrogen sulphide scavengers and (iv) hydrate inhibitors.

8. A method as claimed in claim 1 wherein the production chemical is suspended in the aqueous liquid in the form of particles having a particle size of 100% less than 10 microns.

9. A method as claimed in claim 8 wherein the particles of production chemical are coated with a coating agent selected from water-soluble polymers and oil-soluble polymers.

10. A method as claimed in claim 1 wherein the gellable polymer is selected from the group consisting of biopolysaccharides, cellulose ethers and acrylamide-containing polymers.

11. A method as claimed in claim 1 wherein the concentration of the gellable polymer in the gelling composition is in the range of about 0.01 to 0.5 weight percent.

12. A method as claimed in claim 1 wherein the gelling composition additionally comprises a buffering agent having a buffering capacity at a pH of up to about 5.5.

13. A method as claimed in claim 12 wherein the buffering agent is present in the gelling composition at a concentration in the range 0.001 to 10% by weight based on the weight of the gelling composition.

14. A method as claimed in claim 1 wherein the amount of production chemical is the gelling composition is in the range from 1-25% by weight.

15. A method as claimed in claim 1 wherein the production chemical is released into the formation fluid through thermal and/or biodegradation of the gel under the conditions encountered in the formation.

16. A method as claimed in claim 15 wherein the gel starts to thermally degrade at a temperature in the range 50 to 150° C.

17. A method as claimed in claim 1 wherein the gelling composition contains an effective amount of a gel breaker so as to provide controlled breaking of the gel.

18. A method as claimed in claim 17 wherein the gelling composition comprises from 0.1 to about 10 wt % of gel breaker.

19. A method of increasing the effectiveness of an oil or gas field production chemical by reducing the number of squeezing and shut-in operations needed to increase the production rate from a wellbore penetrating a hydrocarbon-bearing porous subterranean formation, said method comprising:

A) injecting a gelling composition comprising an aqueous liquid, an oil or gas field production chemical and a gellable polymer through the wellbore into the porous subterranean formation wherein the polymer forms a gel in the formation thereby encapsulating the oil or gas field production chemical in the gel;

B) after injecting the gelling composition, optionally over-flushing the porous subterranean formation with an aqueous fluid or an oil;

C) subsequently, shutting-in the well for a period of time; and

D) putting the well back on production and controllably releasing the oil or gas field production chemical from the gel into a formation fluid that is being produced from the well.

20. A method as claimed in claim 19 wherein the well is shut-in for a period of up to 50 hours before putting the well back on production.

21. A method of introducing an oil field or gas field production chemical into a hydrocarbon-bearing porous subterranean formation penetrated by a wellbore comprising:

forming a polymer slug by dispersing or dissolving a gellable polymer in a first aqueous fluid;

forming a crosslinking agent slug by dissolving a crosslinking agent in a second aqueous fluid;

dispersing, suspending or dissolving a production chemical in the polymer slug and/or the crosslinking agent slug;

forming a gelling composition within the pores of the formation by either: (a) injecting the polymer slug into the porous subterranean formation prior to injecting the crosslinking agent slug and back-producing the polymer slug over the crosslinking agent slug or (b) injecting the crosslinking agent slug into the porous subterranean formation prior to injecting the polymer slug and back-producing the crosslinking agent slug over the polymer slug.

22. A method as claimed in claim 21 wherein an aqueous spacer is injected between the polymer slug and crosslinking agent slug and optionally an aqueous pre-flush fluid is injected into the porous subterranean formation prior to injection of the polymer slug, crosslinking slug and aqueous spacer.

23. A method as claimed in claim 21 wherein the production chemical is dissolved, dispersed or suspended in one or more of the aqueous pre-flush fluid, the polymer slug, the crosslinking agent slug or aqueous spacer.

* * * * *